United States Patent Office 2,892,824
Patented June 30, 1959

2,892,824

5,5,5-TRIFLUOROPENTADIENE-1,3 COPOLYMERS

Archibald N. Bolstad, Maplewood, N.J., and John M. Hoyt, Woodside, N.Y., assignors, by mesne assignments, to Minnesota Mining and Manufacturing Company, St. Paul, Minn., a corporation of Delaware No Drawing. Application December 23, 1955
Serial No. 555,189

8 Claims. (Cl. 260—87.5)

This invention relates to halogen-containing copolymers. In one aspect, the invention relates to fluorine-containing copolymers. More particularly in this aspect, the invention relates to, and has for its object, the preparation of fluorine-containing elastomeric copolymers. Still more particularly, in this aspect, the invention relates to, and has for its object, the preparation of elastomeric copolymers of 5,5,5-trifluoropentadiene-1,3 and halogenated monoolefins.

In accordance with the present invention, elastomeric copolymers are produced by copolymerizing 5,5,5-trifluoropentadiene-1,3 with a halogenated monoolefin having not more than 3 carbon atoms and containing a terminal carbon atom bearing at least 1 fluorine atom. Preferably, the 5,5,5-trifluoropentadiene-1,3 is copolymerized with a halogenated monoolefin having not more than 3 carbon atoms in which the halogens are selected from the group consisting of fluorine and chlorine, and containing at least as many halogen atoms as there are carbon atoms and a terminal carbon atom bearing at least 1 fluorine atom. Thus 5,5,5-trifluoropentadiene-1,3, in accordance with the process of the present invention, can be copolymerized to form elastomeric products with such comonomers as 2-chloropentafluoropropene, tetrafluoroethylene, perfluoropropene, 1-chloro-1-fluoroethylene, 1,1-dichloro-2,2-difluoroethylene or 3,3,3-trifluoropropene-1. The copolymers thus obtained are valuable macromolecules which are adaptable to a number of commercial uses, having chemical and physical characteristics comparable to natural-rubber gum stocks and solvent-swell characteristics comparable to fluorine-containing rubbers. These copolymers possess low temperature flexibility, elasticity and resiliency and are easily vulcanized and processed. They are chemically and thermally stable, resistant to oil and hydrocarbon-fuels, selectively soluble in various commercial solvents and can be molded by conventional techniques to yield a wide variety of useful articles. They are also useful as durable, flexible protective coatings on surfaces which are subjected to environmental conditions in which they may come into contact with various corrosive substances such as oils, fuels and strong chemical reagents.

The most useful elastomeric copolymers produced in accordance with this invention contain between about 50 mole percent and about 95 mole percent 5,5,5-trifluoropentadiene-1,3 and the remaining major monomeric constituent being any of the aforementioned halogenated monoolefins. The preferred copolymers of the present invention contain between about 60 mole percent to about 90 mole percent 5,5,5-trifluoropentadiene-1,3 and the remaining major constituent being the aforementioned halogenated monoolefin. The preparation of the monomer 5,5,5-trifluoropentadiene-1,3 is described in the article "Trifluoromethylated Butadienes" by Henne and Hinkamp in the Journal of the American Chemical Society, vol. 76 (1954), pages 5147–5148.

The elastomeric copolymers of the present invention are prepared by employing a water-soluble peroxy-type initiator in a water-emulsion type recipe or an organic peroxide initiator in a bulk-type system. The water-emulsion type recipe system is preferred.

The water-emulsion type recipe system contains, in addition to an emulsifying agent, a water-soluble peroxy-type initiator which is an oxidant, for example, an inorganic persulfate such as potassium persulfate, sodium persulfate, ammonium persulfate or may contain cumene hydroperoxide in a redox-activated system. In addition, the water-emulsion type recipe system may also contain, in some instances, a variable-valence metal salt, for example, an iron salt, such as ferrous sulfate or ferrous nitrate, which is employed for the purpose of inducing the decomposition of initiator. Furthermore, these water-emulsion type recipe systems may also contain sequestering or complexing agents such as sodium pyrophosphate and a reducing sugar such as dextrose. The oxidant in the water-emulsion type recipe system comprises between about 0.1 and about 5 parts by weight per 100 parts of total monomers present. The variable-valence metal salt is preferably employed in an amount between about 0.01 and about 0.2 parts by weight per 100 parts of total monomers present.

The emulsifying agent employed in the above-mentioned water-emulsion type recipe systems is present in the form of a metallic salt of an aliphatic acid having from 14 to 20 carbon atoms per molecule, or in the form of a metallic salt of a halogenated organic acid having from 6 to 18 carbon atoms per molecule. A typical example of these emulsifying agents is the commercially available mixture of potassium salts of oleic, palmitic and stearic acids (Potassium Rubber Reserve Quality Soap, Procter and Gamble Co.). Typical examples of the halogenated acids or salts thereof serving as emulsifying agents in the above-mentioned recipes are polyfluorocarboxylic acids (e.g., perfluorooctanoic acid), or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents in polymerization reactions may also be used in the process of the present invention. The perfluorochlorocarboxylic acid salts which may be used in accordance with this invention are those disclosed in copending application Serial No. 501,782, filed April 18, 1955, as being useful dispersing agents in polymerization reactions. In general, these emulsifying agents comprise between about 0.5 and about 10 parts by weight per 100 parts of total monomers present.

The emulsion polymerization is preferably conducted under alkaline conditions. It is desirable, in these emulsion polymerization systems that the pH be maintained between 7 and 11 in order to prevent gelling of the emulsifying agents, a condition which often causes slow-down or stoppage of the polymerization reaction. In this respect, it should be noted that it is sometimes necessary to maintain the pH of the system between the aforementioned pH limits by the addition of suitable buffer agents.

As indicated above, the polymerization reaction may also be carried out with the catalyst being present in the form of an organic peroxide promoter in a bulk-type polymerization system. In these organic peroxide promoters, halogen-substituted acetyl peroxides are preferably employed. A preferred promoter of this type is trichloroacetyl peroxide. Other halogen-substituted organic peroxides which are suitable for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide. The copolymerization reactions described herein to produce the copolymers of the present invention are carried out under autogenous conditions of pressure. In general, these pressures do not rise above 200 pounds per square inch. The copolymerization reaction is carried out, in general, at a temperature between about −20° C. and about 100° C. Within this range, temperatures between about 25° C. and about 75° C. are preferably employed.

As previously indicated, the elastomeric copolymers of the present invention are particularly suitable and useful for the fabrication of a wide variety of rubber-like materials having highly desirable physical and chemical properties. In this respect, the copolymers of the present invention possess important utility in the manufacture of protective articles of clothing, such as boots, suits, gloves and belts, and in the fabrication of resilient gaskets, seals, pump and valve-diaphragms, films and various other commercial applications.

Another important use of the copolymers of the present invention is in the form of durable, flexible coatings on surfaces which are subjected to distortion in normal use, such as fabric surfaces. For this purpose, the copolymers of the present invention may be dissolved in various commercial solvents. Particularly useful solvents comprise the aliphatic and aromatic esters, ketones and halogenated hydrocarbons. Typical examples of these solvents are methyl ethyl ketone, methyl isobutyl ketone, di-isobutyl ketone, ethyl acetate and 1,1,2-trifluorotrichloroethane. In this respect, it should be noted that it is often desirable to regulate the molecular weight of the copolymers of the present invention in order to obtain greater solubility in organic solvents. It is also of importance in order to vary the softness of the copolymer for easier processibility in molding operations. It is found that the addition of various polymerization modifiers appreciably reduces the molecular weight of the copolymers and increases their solubility and ease of processibility without affecting unduly the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. The modifiers are preferably added in amounts between about 0.01 and about 10 parts by weight per 100 parts of total monomers charged to the polymerization reactions. Dodecyl mercaptan is preferred.

The following examples are offered for a better understanding of the present invention and are not to be construed as limiting its scope.

Example I

This example illustrates the copolymerization of 5,5,5-trifluoropentadiene-1,3 and 2-chloropentafluoropropene to produce an elastomeric copolymer.

A soap solution was prepared by placing 2.4 grams of perfluorooctanoic acid ($C_7F_{15}COOH$) in 160 ml. of deionized water, adding to this solution enough of a 5% solution of potassium hydroxide to produce a clear solution having a pH of 10. After buffering, this solution had a total volume of 180 ml. Thereafter, 0.12 grams of tetriary dodecyl mercaptan was stirred into the soap solution. 9 ml. of the stirred soap solution was then added to a 20-ml. glass polymerization tube and frozen solid by immersing the stoppered tube in a solid carbon dioxide-acetone freezing bath. Thereafter, 1 ml. of a solution containing 1.5 grams of potassium persulfate dissolved in 100 ml. of deionized water was added and the stoppered tube and its contents were refrozen. The tube was then connected to a gas-transfer system and evacuated at liquid nitrogen temperature. To the frozen contents of the tube were added, by distillation, 2.12 grams of 5,5,5-trifluoropentadiene-1,3 and 2.88 grams of 2-chloropentafluoropropene, to make-up a total monomer charge containing 50 mole percent of each monomer.

The polymerization tube was sealed and rotated end-over-end in a temperature-regulated water-bath at 50° C. for a period of 90 hours. At the end of this time, the contents of the tube were coagulated by freezing at liquid nitrogen temperature. The coagulated product was then removed from the tube, washed with hot water and dried to constant weight in vacuo at 35° C. A rubbery copolymer product was obtained, which was found, upon analysis, to comprise approximately 95 mole percent 5,5,5-trifluoropentadiene-1,3 and the remaining major constituent 2-chloropentafluoropropene being present in an amount of approximately 5 mole percent. The copolymer was obtained in an amount corresponding to a 36% conversion.

Example II

This example illustrates the copolymerization of 5,5,5-trifluoropentadiene-1,3 and perfluoropropene to produce an elastomeric copolymer.

Employing the procedure set forth in Example I and the same catalyst solution, the polymerization tube was charged with 2.24 grams of 5,5,5-trifluoropentadiene-1,3 and 2.76 grams of perfluoropropene to make-up a total monomer charge containing 50 mole percent of each monomer.

The polymerization reaction was carried out under autogenous conditions of pressure at a temperature of approximately 50° C. for a period of 90 hours. An elastomeric copolymer was obtained and was found to comprise approximately 79 mole percent 5,5,5-trifluoropentadiene-1,3 and the remaining major constituent perfluoropropene being present in an amount of approximately 21 mole percent. The above copolymer was obtained in an amount corresponding to a 42% conversion.

Example III

This example illustrates the copolymerization of 5,5,5-trifluoropentadiene-1,3 and 1-chloro-1-fluoroethylene to produce an elastomeric copolymer.

Employing the same procedure set forth in Example I and the same catalyst solution, the polymerization tube was charged with 3.02 grams 5,5,5-trifluoropentadiene-1,3 and 1.98 grams of 1-chloro-1-fluoroethylene to make-up a total monomer charge containing 50 mole percent of each monomer.

The polymerization reaction was carried out under autogenous conditions of pressure at a temperature of approximately 50° C. for a period of 90 hours. The resultant elastomeric product was worked-up in accordance with the same precedure as set forth in Example I. An elastomeric copolymer was obtained and was found, upon analysis, to comprise approximately 81 mole percent 5,5,5-trifluoropentadiene-1,3 and the remaining major constituent 1-chloro-1-fluoroethylene being present in an amount of approximately 19 mole percent. The above copolymer was obtained in an amount corresponding to a 51% conversion.

Example IV

This example illustrates the copolymerization of 5,5,5-trifluoropentadiene-1,3 and 1,1-dichloro-2,2-difluoroethylene to produce an elastomeric copolymer.

Employing the same procedure as set forth in Example I and the same catalyst solution, the polymerization tube was charged with 2.39 grams of 5,5,5-trifluoropentadiene-1,3 and 2.61 grams of 1,1-dicholoro-2,2-difluoroethylene to make-up a total monomer charge containing 50 mole percent of each monomer.

The polymerization reaction was carried out under autogenous conditions of pressure at a temperature of approximately 50° C. for a period of 90 hours. The resultant elastomeric product was worked-up in accordance with the same procedure as set forth in Example I. An elastomeric copolymer was obtained and was found to compromise approximately 89 mole percent 5,5,5-trifluoropentadiene-1,3 and the remaining major constituent 1,1-dichloro - 2,2 - difluoroethylene being present in an amount of approximately 11 mole percent. The above copolymer was obtained in an amount corresponding to a 38% conversion.

*Example V*

This example illustrates the copolymerization of 5,5,5-trifluoropentadiene-1,3 and 3,3,3-trifluoropropene-1 to produce an elastomeric copolymer.

Employing the same procedure as set forth in Example I and the same catalyst solution, the polymerization tube was charged with 2.40 grams of 5,5,5-trifluoropentadiene-1,3 and 2.60 grams of 3,3,3-trifluoropropene-1 to make-up a total monomer charge containing 50 mole percent of each monomer.

The polymerization reaction was carried out under autogenous conditions of pressure at a temperature of 50° C. for a period of 90 hours. The resultant elastomeric product was worked-up in accordance with the same procedure as set forth in Example I. An elastomeric copolymer was obtained and was found, upon analysis, to comprise approximately 86 mole percent 5,5,5-trifluoropentadiene-1,3 and the remaining major constituent 3,3,3-trifluoropropene-1 being present in an amount of approximately 14 mole percent. The above copolymer was obtained in an amount corresponding to a 40% conversion.

*Example VI*

This example illustrates the copolymerization of 5,5,5-trifluoropentadiene-1,3 and tetrafluoroethylene to produce an elastomeric copolymer.

A soap solution was prepared according to the following procedure: 5 parts of potassium Rubber Reserve Quality Soap (Procter and Gamble Co.) and 140 parts of water were heated to 75° C. until the entire quantity of soap was dissolved. The resulting solution was cooled to 30° C. and the pH adjusted to 10 with dilute hydrochloric acid or potassium hydroxide, as required. 0.20 part of cumene hydroperoxide and 0.30 part of dodecyl mercaptan were added to this solution and thoroughly mixed to emulsify the mixture.

An activator solution was prepared according to the following procedure: 43 parts of water were heated to 90° C. under a nitrogen atmosphere. To this solution were added 1 part $Na_4P_2O_7 \cdot 10H_2O$ and 1 part of anhydrous dextrose. The temperature was held at 90° C. for approximately ten minutes. The resulting solution was then cooled to 60° C. and 0.10 part of $FeSO_4 \cdot 7H_2O$, dissolved in 7 parts of water, were added. The resulting solution was cooled to 30° C. and 10 ml. more of water were added. The solution was stored under nitrogen until used.

7 ml. of the aforementioned soap solution and 3 ml. of the activator solution were charged to a heavy-walled glass polymerization tube. The contents of the tube were frozen in liquid nitrogen after each addition. The tube was next connected to a gas-transfer system and evacuated at liquid nitrogen temperature. To the frozen contents of the tube were added, by distillation, 2.78 grams of 5,5,5-trifluoropentadiene-1,3 and 2.45 grams of tetrafluoroethylene to make-up a total monomer charge containing 48 mole percent 5,5,5-trifluoropentadiene-1,3 and 52 mole percent tetrafluoroethylene.

The polymerization tube was sealed and rotated end-over-end in a temperature-regulated water-bath at 20° C. for a period of 24 hours. At the end of this time, the contents of the tube were coagulated by freezing at liquid nitrogen temperature. The coagulated product was then removed from the tube, washed with hot water and then dried to constant weight in vacuo at 35° C. A rubbery copolymeric product was obtained, which was found, upon analysis, to comprise approximately 86 mole percent 5,5,5-trifluoropentadiene-1,3 and the remaining major constituent tetrafluoroethylene being present in an amount of approximately 14 mole percent. The above copolymer was obtained in an amount corresponding to a 48% conversion.

As previously indicated, the elastomeric copolymers of the present invention possess highly desirable chemical and physical properties which make them useful for the fabrication of a wide variety of rubber-like articles or for application to various surfaces as protective coatings. In such uses, the raw elastomeric copolymer can be pressed into sheets at temperatures between about 200° F. and about 400° F. and at a pressure between about 500 and about 1500 pounds per square inch for a period of about 5 to about 60 minutes. Thereafter, various articles can be molded from preforms cut from sheets or extruded stock in the form of gaskets, diaphragms, etc. In this respect, it should also be noted that it is preferred, in such applications, that the raw copolymer also include various vulcanizing agents and fillers, if so desired.

When employed as protective coatings on any of the surfaces previously described, the raw elastomeric copolymer is dissolved in any of the aforementioned solvents, and is applied to the desired surface employing such apparatus as a knife-spreader or a doctor-blade or a reverse-roll coater. The solvent, after the elastomeric coating composition has been applied to the surface, is permitted to evaporate. This may also be accomplished in the presence of elevated temperatures. In many applications, it is desirable to include, in the elastomeric coating composition, various vulcanizing agents, in which case supplementary heat-treatment of the coating is required, either during the solvent removal step or thereafter. After the solvent has been completely evaporated, and after the vulcanization step, if included, has been completed, the coated surface is ready for use. In this respect, it should also be noted that the copolymeric coating composition may be applied to the surface either as a single coating, or, if so desired, the protective coating may be built-up by the application of several layers, each layer being permitted to harden by solvent evaporation before the next layer is applied. Furthermore, if so desired, the protective coatings, or the elastomeric copolymer when obtained in the form of sheets, must be suitably pigmented. Other uses for the copolymers of the present invention reside in the fabrication of pressure-sensitive tape for electrical insulation purposes or as adhesives for fastening a rubber surface to a metal or another rubber surface.

Since certain changes may be made in carrying out the process of the present invention in producing the desired elastomeric copolymers without departing from the scope of the invention, it is intended that all matter contained in the above description is to be interpreted as illustrative and not in a limiting sense.

We claim:

1. A process for preparing a copolymer which comprises copolymerizing a mixture containing between about 50 and about 95 mole percent 5,5,5-trifluoropentadiene-1,3 and correspondingly between about 50 and about 5 mole percent of a halogenated propene in which the halogens are selected from the group consisting of fluorine and chlorine and containing at least as many halogen atoms as there are carbon atoms and a terminal carbon atom bearing at least one fluorine atom at a temperature between about −20° C. and about 100° C. in the presence of a polymerization catalyst.

2. A process for preparing a copolymer which comprises copolymerization a mixture containing between about 60 and about 90 mole percent 5,5,5-trifluoropentadiene-1,3 and correspondingly between about 40 and about 10 mole percent of a halogenated propene in which the halogens are selected from the group consisting of fluorine and chlorine and containing at least as many halogen atoms as there are carbon atoms and a terminal carbon atom bearing at least one fluorine atom at a temperature between about −20° C. and about 100° C. in the presence of a polymerization catalyst.

3. A rubbery copolymer of 5,5,5-trifluoropentadiene-1,3 and a halogenated propene in which the halogens are selected from the group consisting of fluorine and chlorine and containing at least as many halogen atoms as there are carbon atoms and a terminal carbon atom bearing at least one fluorine atom, the composition of said copolymer being between about 50 and about 95 mol percent 5,5,5-trifluoropentadiene, the remaining major constituent being said halogenated propene.

4. A rubbery copolymer of about 60 to about 90 mole percent of 5,5,5-trifluoropentadiene-1,3 and correspondingly about 40 to about 10 mole percent of a halogenated propene in which the halogens are selected from the group consisting of fluorine and chlorine and containing at least as many halogen atoms as there are carbon atoms and a terminal carbon atom bearing at least one fluorine atom.

5. A rubbery copolymer of about 50 to about 95 mole percent 5,5,5-trifluoropentadiene-1,3 and correspondingly about 50 to about 5 mole percent 2-chloropentafluoropropene.

6. A rubbery copolymer of about 50 to about 95 mole percent 5,5,5-trifluoropentadiene-1,3 and correspondingly about 50 to about 5 mole percent perfluoropropene.

7. The process of claim 1 in which said halogenated propene is 2-chlolopentafluoropropene.

8. The process of claim 1 in which said halogenated propene is perfluoropropene.

References Cited in the file of this patent

UNITED STATES PATENTS

| | | |
|---|---|---|
| 2,484,530 | Schroeder | Oct. 11, 1949 |
| 2,490,753 | Hill et al. | Dec. 6, 1949 |
| 2,684,959 | Rearick | July 27, 1954 |
| 2,750,431 | Tarrant et al. | June 12, 1956 |

OTHER REFERENCES

Henne et al.: "Trifluoromethylated Butadienes," Journal of American Chemical Society, vol. 76 (1954), pages 5147–5148.